United States Patent
Uka et al.

(10) Patent No.: US 10,236,130 B2
(45) Date of Patent: Mar. 19, 2019

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Youichirou Uka, Osaka (JP); Shintaro Tanimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/381,479

(22) Filed: Dec. 16, 2016

(65) Prior Publication Data

US 2017/0098510 A1    Apr. 6, 2017

Related U.S. Application Data

(63) Continuation of application No. PCT/JP2015/003433, filed on Jul. 8, 2015.

(30) Foreign Application Priority Data

Jul. 10, 2014  (JP) ................................. 2014-142594

(51) Int. Cl.
*H01G 9/02* (2006.01)
*H01G 9/048* (2006.01)
(Continued)

(52) U.S. Cl.
CPC .......... *H01G 9/028* (2013.01); *H01G 9/0036* (2013.01); *H01G 9/012* (2013.01); *H01G 9/15* (2013.01)

(58) Field of Classification Search
CPC ....... H01G 9/028; H01G 9/0036; H01G 9/048
(Continued)

(56) References Cited

U.S. PATENT DOCUMENTS

2012/0057275 A1  3/2012  Intelmann et al.
2014/0199585 A1* 7/2014  Rupert ................... H01G 11/62
                                                                  429/188
(Continued)

FOREIGN PATENT DOCUMENTS

CN        103748164 A     4/2014
JP        2012-017398 A    1/2012
(Continued)

OTHER PUBLICATIONS

English Translation of Chinese Search Report dated Feb. 1, 2018 for the related Chinese Patent Application No. 201580033465.X.
(Continued)

*Primary Examiner* — Michael P McFadden
(74) *Attorney, Agent, or Firm* — McDermott Will & Emery LLP

(57) ABSTRACT

Disclosed is an electrolytic capacitor including: an anode body; a dielectric layer formed over the anode body; a first conductive polymeric layer covering at least one portion of the dielectric layer; a second conductive polymeric layer covering at least one portion of the first conductive polymeric layer; and an intermediate layer formed between the first conductive polymeric layer and the second conductive polymeric layer. The intermediate layer includes a cation agent containing at least one cationic group, and an anion agent containing at least one first anionic group and at least one second anionic group, and the first anionic group is higher in electron-withdrawing property than the second anionic group. The anion agent includes a polymer containing the first anionic group and the second anionic group.

27 Claims, 1 Drawing Sheet

(51) Int. Cl.
*H01G 9/028* (2006.01)
*H01G 9/00* (2006.01)
*H01G 9/012* (2006.01)
*H01G 9/15* (2006.01)

(58) Field of Classification Search
USPC .......................................................... 361/527
See application file for complete search history.

(56) References Cited

U.S. PATENT DOCUMENTS

2014/0211374 A1* 7/2014 Sugihara ................. C08L 65/00
361/527
2015/0140203 A1 5/2015 Intelmann et al.

FOREIGN PATENT DOCUMENTS

| JP | 2012-517113 | | 7/2012 |
| JP | 2014086473 A | * | 5/2014 |
| WO | 2013/035548 | | 3/2013 |

OTHER PUBLICATIONS

International Search Report of PCT application No. PCT/JP2015/003433 dated Sep. 29, 2015.

* cited by examiner

ELECTROLYTIC CAPACITOR AND METHOD FOR MANUFACTURING SAME

TECHNICAL FIELD

The present invention relates to an electrolytic capacitor having a conductive polymeric layer, and a production method therefor.

BACKGROUND ART

In recent years, with a decrease in the size and the weight of electronic instruments, small-sized and large-capacity capacitors for high frequencies have been desired. As such capacitors, developments have been advanced about electrolytic capacitors small in equivalent series resistance (ESR) and excellent in frequency properties. Electrolytic capacitors each include an anode body including a valve action metal such as tantalum, niobium, titanium or aluminum, a dielectric layer formed on the anode body, and a cathode body. Out of these electrolytic capacitors, the following are also called solid electrolytic capacitors: electrolytic capacitors in each of which a conductive polymeric layer containing a conductive polymeric layer (solid electrolytic layer) is formed as a cathode member on a dielectric layer.

In order to heighten the conductive polymeric layer in strength, investigations have been made about the use of a crosslinking agent when the conductive polymeric layer is formed. For example, according to Patent Literature 1, a conductive polymeric layer (polymeric outer layer) is formed by: forming a solid electrolytic layer containing a conductive polymer; immersing this layer into a solution containing a crosslinking agent and then drying the layer; and immersing the layer into a liquid dispersion containing a conductive polymer and then drying the layer. According to Patent Literature 1, in order to restrain the conductive polymeric layer of a capacitor element from being peeled off and make the conductive polymeric layer high in performance of covering terminal portions of the capacitor element, the crosslinking agent is used before the formation of the polymeric outer layer, as described above.

CITATION LIST

Patent Literature

PTL 1: Japanese Translation No. 2012-517113 of PCT Publication

SUMMARY OF THE INVENTION

Technical Problems

However, even when the crosslinking agent described in Patent Literature 1 is used, the upper of the solid electrolytic layer cannot be sufficiently covered with the conductive polymeric layer (polymeric outer layer), so that the electrolytic capacitor cannot be decreased in ESR, and may further be increased in leakage current.

Thus, an object of the present invention is to decrease an electrolytic capacitor having a conductive polymeric layer in ESR and further restrain this capacitor from being increased in leakage current.

Solution to Problems

An aspect of the present invention relates to an electrolytic capacitor, comprising: an anode body; a dielectric layer formed over the anode body; a first conductive polymeric layer covering at least one portion of the dielectric layer; a second conductive polymeric layer covering at least one portion of the first conductive polymeric layer; and an intermediate layer formed between the first conductive polymeric layer and the second conductive polymeric layer;

wherein the intermediate layer comprises a cation agent containing at least one cationic group, and an anion agent containing at least one first anionic group and at least one second anionic group;

the anion agent comprises a polymer containing the first anionic group and the second anionic group; and the first anionic group is higher in electron-withdrawing property than the second anionic group.

Another aspect of the present invention relates to a method for manufacturing an electrolytic capacitor, comprising:

a first step of preparing an anode body;

a second step of forming a dielectric layer over the anode body;

a third step of treating the anode body, in which the dielectric layer is formed, with a first treating liquid comprising a first conductive polymer;

a fourth step of treating the anode body treated with the first treating liquid with a second treating liquid comprising a cation agent containing at least one cationic group, and an anion agent containing at least one first anionic group and at least one second anionic group; and a fifth step of treating the anode body treated with the second treating liquid with a third treating liquid comprising a second conductive polymer;

wherein the anion agent comprises a polymer containing the first anionic group and the second anionic group; and the first anionic group is higher in electron-withdrawing property than the second anionic group.

Advantageous Effects of Invention

The present invention makes it possible to provide an electrolytic capacitor decreased in ESR and restrained from being increased in leakage current, and a method for manufacturing this electrolytic capacitor.

DESCRIPTION OF EMBODIMENT

Figure 1:
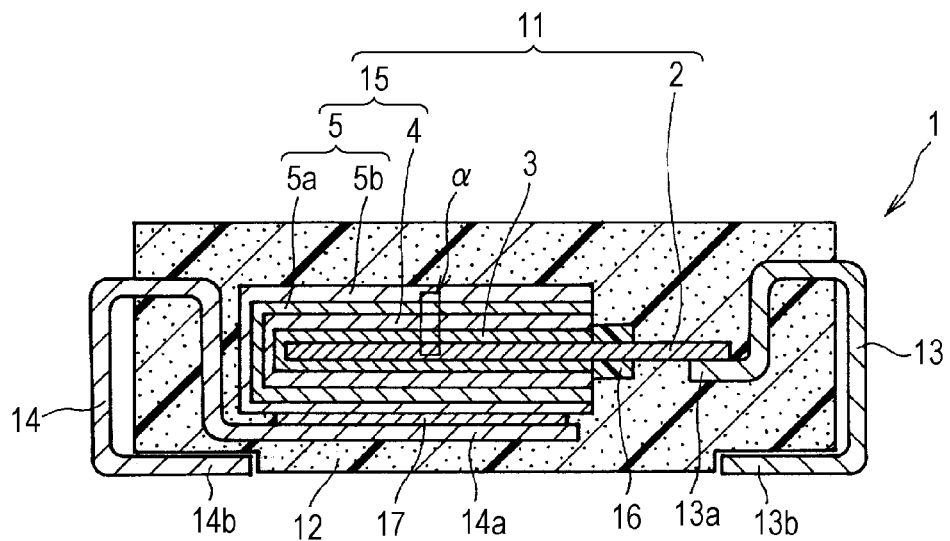
FIG. 1 is a schematic sectional view of an electrolytic capacitor according to an exemplary embodiment of the present invention.

Hereinafter, with reference to the drawings, a description will be made about an exemplary embodiment of the electrolytic capacitor of the present invention and a method of the present invention for manufacturing an electrolytic capacitor.

Electrolytic Capacitor:

An electrolytic capacitor according to the exemplary embodiment of the present invention includes: an anode body; a dielectric layer formed over the anode body; a first conductive polymeric layer covering at least one portion of the dielectric layer; a second conductive polymeric layer covering at least one portion of the first conductive polymeric layer; and an intermediate layer formed between the first conductive polymeric layer and the second conductive polymeric layer. The intermediate layer includes a cation agent containing at least one cationic group, and an anion agent containing at least one first anionic group and at least one second anionic group. The anion agent includes a polymer containing the first anionic group and the second anionic group. The first anionic group is higher in electron-withdrawing property than the second anionic group. The polymer may be referred to as a first anion agent.

The first conductive polymeric layer and the second conductive polymeric layer usually each contain an anionic dopant together with a conductive polymer. This dopant is easily present in respective surfaces of the first conductive polymeric layer and the second conductive polymeric layer. In other words, about each of the first conductive polymeric layer and the second conductive polymeric layer, its surface is easily electrified into minus charge, so that the second conductive polymeric layer is not easily formed onto the surface of the first conductive polymeric layer. According to an exemplary embodiment of the present invention, the formation of the cation-agent-including intermediate layer makes it possible to heighten the second conductive polymeric layer in formability and/or covering performance. Moreover, the use of the anion agent makes it possible to heighten a cover-repairing performance of the dielectric layer.

In order for the present invention to gain the advantageous effects of the cation agent sufficiently, the cation agent needs to be made into a sufficiently dissociated state in a treating liquid for forming the intermediate layer. However, the cation agent is low in solubility and also high in volatility, so that it is difficult to heighten the content by percentage of the cation agent in the intermediate layer. In the meantime, the coexistence of the anion agent with the cation agent makes it easy to promote the dissociation of the cation agent stably. However, if the anionic groups of the anion agent are too high in electron-withdrawing property, a valve action metal that may constitute the anode body corrodes easily.

According to the exemplary embodiment of the present invention, the matter that the anion agent contains the first anionic group(s) high in electron-withdrawing property heightens the dissociatability and solubility of the cation agent in the treating liquid for forming the intermediate layer. As a result, the second conductive polymeric layer can be heightened in formability and/or covering performance to decrease the electrolytic capacitor in ESR. Moreover, the matter that the above-mentioned anion agent contains the second anionic group(s) heightens a coating repairing effect of the dielectric layer, so that the electrolytic capacitor can be restrained from being increased in leakage current. The matter that the anion agent contains the second anionic group(s), which is/are lower in electron-withdrawing property than the first anionic group(s), also makes it possible to restrain the valve action metal, which may constitute the anode body, from being corroded. The anion agent in the present exemplary embodiment makes it possible to restrain an increase in the leakage current since this agent is a polymer containing the first anionic group and the second anionic group.

Figure 2:
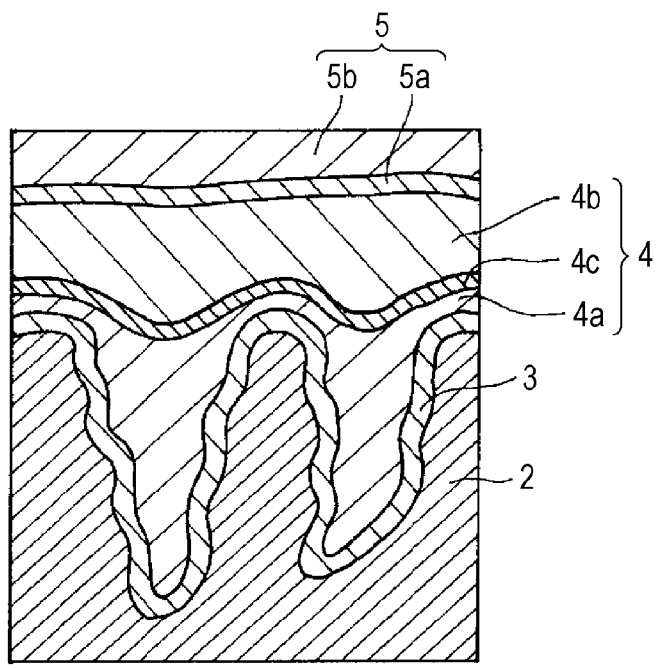
FIG. 2 is an enlarged view of a region surrounded by a solid line a in FIG. 1.

FIG. 1 is a schematic sectional view of the electrolytic capacitor according to an exemplary embodiment of the present invention. FIG. 2 is an enlarged view of a region surrounded by a solid line α of FIG. 1.

The electrolytic capacitor, which is electrolytic capacitor 1, has capacitor element 11, resin external package 12 for sealing the capacitor element 11, and anode terminal 13 and cathode electrode 14 each made naked outside resin external package 12. Capacitor element 11 includes anode body 2 (or anode portion) in a foil-piece or plate form, dielectric layer 3 covering a one-end-portion side of anode body 2, and cathode portion (cathode member) 15 covering dielectric layer 3. Anode terminal 13 is electrically connected to anode body 2, and cathode terminal 14 is electrically connected to cathode portion 15. Resin external package 12 has a substantially rectangular parallelepiped external shape. By this matter, electrolytic capacitor 1 also has a substantially rectangular parallelepiped external shape.

Anode body 2 and cathode portion 15 are opposed to each other across dielectric layer 3. Cathode portion 15 has conductive polymeric layer 4 covering dielectric layer 3, and cathode layer 5 covering conductive polymeric layer 4. Cathode layer 5 illustrated has a bilayered structure, and has carbon layer 5a contacting conductive polymeric layer 4, and silver paste layer 5b covering the surface of carbon layer 5a.

In the other end portion of anode body 2 that is projected from cathode portion 15, and a cathode-portion-15-side region of this end portion, insulating separation portion 16 is formed to cover surfaces of anode body 2 into a band form, so that contact between cathode portion 15 and anode body 2 is regulated. The other end portion of anode body 2, which is projected from cathode portion 15, is electrically connected to first end portion 13a of anode terminal 13 by, e.g., welding. Cathode layer 5 formed as the outermost layer of cathode portion 15 is electrically connected to first end portion 14a of cathode terminal 14 through conductive adhesive material 17 (such as a mixture of a thermosetting resin and metallic particles). Second end portion 13b of anode terminal 13, and second end portion 14b of cathode terminal 14 are pulled out, respectively, from different side-surfaces of resin external package 12 to be extended in a naked state to one of the main flat surfaces of the electrolytic capacitor (the lower surface of the electrolytic capacitor in FIG. 1). In this flat surface, a position where each of the terminals is naked is used for connection with a substrate (not illustrated) on which electrolytic capacitor 1 is to be mounted, using, e.g., a solder.

Dielectric layer 3 is formed on one or more portions of surfaces of the conductive material constituting anode body 2. Specifically, dielectric layer 3 can be formed by anodizing the surface(s) of the conductive material constituting anode body 2. As illustrated in FIG. 2, therefore, dielectric layer 3 is formed along the surface(s) (including internal wall surfaces of holes or pits made in the inner surface(s)) of anode body 2.

First conductive polymeric layer 4a is formed to cover dielectric layer 3, and second conductive polymeric layer 4b is formed to cover first conductive polymeric layer 4a. Intermediate layer 4c is formed between first conductive polymeric layer 4a and second conductive polymeric layer 4b. In the illustrated example, intermediate layer 4c is formed to cover first conductive polymeric layer 4a, and second conductive polymeric layer 4b is formed to cover intermediate layer 4c.

It is not necessarily that first conductive polymeric layer 4a needs to cover the whole (the entire surfaces) of dielectric layer 3. It is sufficient that first conductive polymeric layer 4a is formed to cover at least one portion of dielectric layer 3. It is desired that first conductive polymeric layer 4a is formed to cover regions of dielectric layer 3 as large as possible. In the same way, it is not necessarily essential that second conductive polymeric layer 4b and intermediate layer 4c each need to cover the whole (the entire surfaces) of first conductive polymeric layer 4a. It is sufficient that second conductive polymeric layer 4b is formed to cover at least one portion of first conductive polymeric layer 4a. It is desired that second conductive polymeric layer 4b is formed to cover regions of conductive polymeric layer 4a as large as possible. In the illustrated example, first conductive polymeric layer 4a, second conductive polymeric layer 4b and intermediate layer 4c have been illustrated as conductive polymeric layer 4. In general, however, conductive-polymer-containing layers, such as first conductive polymeric layer 4a, second conductive polymeric layer 4b and conductive polymeric layer 4, may each be called a solid electrolytic layer.

Since dielectric layer 3 is formed along the surfaces of anode body 2, irregularities are made in the surfaces of dielectric layer 3 in accordance with the shape of the surfaces of anode body 2. First conductive polymeric layer 4a is formed preferably to embed the irregularities of dielectric layer 3 into first conductive polymeric layer 4a.

In the above-mentioned structure, anode body 2 is an anode member of capacitor element 11 while first conductive polymeric layer 4a, second conductive polymeric layer 4b and cathode layer 5 are a cathode member of capacitor element 11. Dielectric layer 3 is a dielectric member of capacitor element 11.

Hereinafter, the structure of the electrolytic capacitor will be described in more detail.

Anode Body:

For the anode body, a conductive material large in surface area is usable. Examples of the conductive material include valve action metals, alloys each containing a valve action metal, and compounds each containing a valve action metal. These materials may be used singly or in any combination of two or more thereof. The valve action metal(s) may be preferably, for example, titanium, tantalum, aluminum and/or niobium. Not only these metals but also respective oxides of the metals are high in dielectric constant to be each suitable for a constituent material of the anode body. The anode body is, for example, a body obtained by roughening one or more surfaces of a substrate (such as a substrate in the form of, e.g., a foil-piece or plate) made of a conductive material; or a shaped body or sintered body of particles of a conductive material.

Dielectric Layer:

The dielectric layer can be formed by anodizing the conductive material of the surface(s) of the anode body by, e.g., chemical conversion treatment. Thus, the dielectric layer includes an oxide (of, in particular, a valve action metal). When, for example, tantalum is used as the valve action metal, the dielectric layer contains $Ta_2O_5$. When aluminum is used as the valve action metal, the dielectric layer contains $Al_2O_3$. The dielectric layer is not limited to such dielectric layers. Thus, the dielectric layer may be any layer as far as the layer functions as a dielectric.

When the anode body is in the form of a foil-piece or plate and the surface(s) of the anode body is/are roughened, the dielectric layer is formed, as illustrated in FIG. 2, along internal wall surfaces of holes or pits made in the surface(s) of anode body 2.

First Conductive Polymeric Layer

It is sufficient for the first conductive polymeric layer to be formed to cover at least one portion of the dielectric layer. This first conductive polymeric layer may be formed to cover the whole of one or more surfaces of the dielectric layer.

The first conductive polymeric layer includes a first conductive polymer. The first conductive polymeric layer further includes a dopant. The dopant may be included in the first conductive polymeric layer in a state that this layer is doped with the dopant. The dopant may be included in the first conductive polymeric layer in a state that the dopant is bonded to the first conductive polymer.

First Conductive Polymer:

The first conductive polymer may be a known conductive polymer usable for an electrolytic capacitor, and is, for example, a π-conjugated system conductive polymer. The conductive polymer is, for example, a polymer having, as a basic skeleton thereof, a polypyrrole, a polythiophene, a polyfuran, a polyaniline, a polyacetylene, a polyphenylene, a polyphenylenevinylene, a polyacene, and/or a polythiophenevinylene.

The polymer may be a homopolymer, or a copolymer made from two or more monomers, or any derivative (such as a substituted body having a substituent) of the homopolymer or copolymer. For example, the polythiophene is, for example, poly(3,4-ethylenedioxythiophene). Such conductive polymers are high in conductivity, and excellent in ESR property.

The conductive polymers may be used singly or in any combination of two or more thereof.

The weight-average molecular weight of the conductive polymers is not particularly limited, and is, for example, from 1,000 to 1,000,000 both inclusive.

Dopant:

The dopant may be, for example, a low molecular weight compound having an acidic group (or an anionic group) (referred to also as a low molecular type dopant), or a polymeric compound (referred to also as a high molecular type dopant). The use of the high molecular type dopant makes it possible to form a more homogeneous first conductive polymeric layer. Dopants may be used singly, or in any combination of two or more thereof.

The low molecular type dopant may be, for example, one or more compounds (each) having an anionic group, such as a sulfonate group, a carboxyl group, a phosphate group (—O—P(=O)(—OH)$_2$), and/or a phosphonate group (—P(=O)(—OH)$_2$). This compound may be, for example, a cyclic compound in which an anionic group is bonded to an aromatic ring (such as a $C_{6-14}$ aromatic ring), e.g., benzene, naphthalene or anthracene, or to a condensed ring made from an aromatic ring (such as a $C_{6-14}$ aromatic ring) and an aliphatic ring. The anionic group is preferably a sulfonate group, and may be a combination of a sulfonate group with a group other than the sulfonate group. The aromatic ring and/or the aliphatic ring, which is/are included in the cyclic compound, may (each) have a substituent (such as an alkyl group such as a methyl group, or an oxo group (=O)) other than the anionic group. Specific examples of such a compound include alkylbenzenesulfonic acid, such as benzenesulfonic acid and p-toluenesulfonic acid; naphthalenesulfonic acid; and anthraquinonesulfonic acid.

The high molecular type dopant may be, for example, a polymeric compound having one or more anionic groups, such as a sulfonate group, a phosphate group (—O—P(=O)(—OH)$_2$), and/or a phosphonate group (—P(=O)(—OH)$_2$). Among these anionic groups, a sulfonate group is preferred. The high molecular type dopant having a sulfonate group is, for example, a homopolymer or copolymer made from a monomer having a sulfonate group (for example, a vinyl monomer having a sulfonate group, or a diene monomer having a sulfonate group such as isoprenesulfonic acid). Examples of the vinyl monomer having a sulfonate group include aliphatic vinyl monomers each having a sulfonate group, such as vinylsulfonic acid, allylsulfonic acid, and 2-acrylamide-2-methylpropanesulfonic acid; and aromatic vinyl monomers each having a sulfonate group, such as styrenesulfonic acid. These vinyl monomers may be used singly or in any combination of two or more thereof. The copolymer may be a copolymer made from monomers having two or more sulfonate group species, respectively; or a copolymer made from a monomer having a sulfonate group, and another monomer. Examples of the high molecular type dopant also include polyestersulfonic acids, and/or phenolsulfonic acid novolak resins.

In each of the low molecular type dopant and the high molecular type dopant, the anionic group is not particularly limited as far as this group can produce an anion when the group is in a dissociated state. Thus, the anionic group may be, for example, any salt or ester of the anionic group.

The weight-average molecular weight of the high molecular type dopant is, for example, from 1,000 to 1,000,000 both inclusive, preferably from 10,000 to 500,000 both inclusive. The use of the high molecular type dopant having such a molecular weight makes it possible to make the first conductive polymeric layer even more homogeneous. About the homopolymer and copolymer made from the monomer having a sulfonate group, the weight-average molecular weight is more preferably from 10,000 to 500,000 both inclusive. About polyestersulfonic acids and phenolsulfonic acid novolak resins, the weight-average molecular weight is more preferably from 5,000 to 80,000 both inclusive.

The amount of the dopant included in the first conductive polymeric layer is preferably from 10 parts by mass to 1000 parts by mass both inclusive, more preferably from 50 parts by mass to 200 parts by mass both inclusive for 100 parts by mass of the first conductive polymer.

The anode body has a large surface area, and the dielectric layer is formed not only onto the outer surface(s) of the anode body but also internal wall surfaces of holes and pits made in the surface(s) of the anode body. It is preferred to form the first conductive polymeric layer also onto the dielectric layer formed on the internal wall surfaces to heighten the first conductive polymeric layer in covering proportion.

Intermediate Layer:

It is sufficient for the intermediate layer to be formed to cover at least one portion of the first conductive polymeric layer. The intermediate layer may be formed to cover the whole of the surface(s) of the first conductive polymeric layer. In one or more regions of electrolytic capacitor where the first conductive polymeric layer is not formed, the intermediate layer may contact the dielectric layer (in other words, the intermediate layer may be formed to cover one or more regions of the dielectric layer). Moreover, the intermediate layer may be in the state of getting partially into the first conductive polymeric layer.

Cation Agent:

The intermediate layer includes a cation agent containing at least one cationic group. The cation agent is not particularly limited as far as the cation agent can produce a cation when the agent is a dissociated state. The cation agent may be, for example, a metal compound (for example, an inorganic base such as a metal hydroxide), and is preferably an organic compound (for example, an organic base). The cationic group(s) of the cation agent, which is the organic compound, is/are (each) preferably an amino group (such as a primary, secondary or tertiary amino group), or a quarterly ammonium group. The cationic group(s) may (each) be, for example, a salt of an amino group, or a salt of a quarterly ammonium group.

Among such cation agents, preferred is a cation agent having one or more amino groups as the cationic group(s) (for example, an amine compound). The amine compound is, for example, an amine (any one of primary to ternary amines) having, on a nitrogen atom thereof, 1 to 3 substituents (such as an alkyl group, a cycloalkyl group and/or an aryl group); or a diamine which may have, on a nitrogen atom thereof, one or two alkyl groups.

Examples of the alkyl group, which the amine or the diamine has, include $C_{1-16}$ alkyl groups such as methyl, ethyl, 1-propyl, 2-propyl, 1-butyl, tert-butyl, hexyl, 2-ethylhexyl, octyl, decyl and dodecyl. The alkyl group may be in a linear or branched form. At least one alkyl group that the ammonium cation has preferably has a $C_{4-16}$ alkyl group (or a $C_{6-12}$ alkyl group or a $C_{6-10}$ alkyl group). A different alkyl group in each of the amine and the diamine may be a $C_{1-10}$ alkyl group (or a $C_{1-6}$ alkyl group or a $C_{1-4}$ alkyl group).

Examples of the cycloalkyl group include $C_{4-10}$ cycloalkyl groups (or $C_{5-8}$ cycloalkyl groups) such as cyclopentyl, cyclohexyl, and cyclooctyl. Examples of the aryl group include $C_{6-14}$ aryl groups such as phenyl and naphthyl.

The alkyl group, the cycloalkyl group and the aryl group may each have one or more substituents such as a hydroxy group and/or an alkoxy group (such as a $C_{1-6}$ alkoxy group or a $C_{1-4}$ alkoxy group, such as methoxy or ethoxy).

Examples of the above-mentioned diamine include diaminoalkanes, diaminocycloalkanes (such as diamino $C_{5-8}$ cycloalkanes such as diaminocyclohexane), and diaminoarenes (such as diamino $C_{6-14}$ arenes such as diaminobenzene and diaminonaphthalene). These diamines may each have, on an alkane, cycloalkane or arene moiety thereof, one or more substituents such as a hydroxyl group and/or an alkoxy group (such as a $C_{1-6}$ alkoxy group or a $C_{1-4}$ alkoxyl group, such as methoxy or ethoxy).

Examples of the diaminoalkane include diamino $C_{2-14}$ alkanes (or diamino $C_{4-12}$ alkanes) such as 1,4-diaminobutane, 1,6-diaminohexane, 1,8-diaminooctane, and 1,10-diaminodecane. These diamines may have, on each of the nitrogen atoms thereof, one or two alkyl groups. Examples of the alkyl group(s) include the alkyl groups given above as examples. The alkyl group(s) may (each) be in a linear or branched form. The alkyl group(s) may (each) have one or more substituents such as a hydroxyl group and/or an alkoxy group (such as a $C_{1-6}$ alkoxyl group or a $C_{1-4}$ alkoxyl group, such as methoxy or ethoxy).

The amine may be a primary amine and/or a tertiary amine Examples of the tertiary amine include N,N-di($C_{1-10}$ alkyl)-N—($C_{4-16}$ alkyl)amines, N,N-di($C_{4-16}$ alkyl)-N—($C_{1-10}$ alkyl)amines, and tri($C_{4-16}$ alkyl)amines.

The intermediate layer may include one cation agent, or a combination of two or more cation agents.

The intermediate layer may include the cation agent in any one of an amine compound form, an amine-compound-corresponding cation form, a quaternary ammonium compound form, and/or a cationic salt form. In the intermediate layer, for example, the cation agent may be combined with an anion agent to produce a salt.

Anion Agent:

The anion agent includes a polymer (first anion agent) containing at least one first anionic group and at least one second anionic group. Examples of the anionic groups contained in the anion agent include sulfonate, phosphate, phosphonate, borate, carboxyl, and hydroxyl groups. The anionic groups are each not particularly limited as far as the anionic group can produce an anion when the group is in a dissociated state. The anionic group may be, for example, a salt of each of the groups described just above. It is important that the anion agent contains one or more first anionic groups and one or more second anionic groups lower in electron-withdrawing property than the first anionic group(s). The first anionic group(s) and the second anionic group(s), the former(s) being different from the latter(s) in electron-withdrawing property, may be appropriately selected from anionic groups as described above.

In the intermediate layer, or a treating liquid for forming the intermediate layer, the anionic group(s) of the anion agent may (each) be included in any one of the form of the anionic group(s), the form of one or more anions corresponding to the anionic group(s), and the form of one or more salts of the anion(s). Thus, examples of, e.g., the sulfonate group also include a free sulfonic acid group (—$SO_3H$), a sulfonate anion (—$SO_3$—), and sulfonate salts. Example of the phosphate group include a free phosphoric acid group (—OP(=O)(OH)$_2$), phosphate anions (—$OPO_3H$— and $OPO_3^{2-}$), and phosphate salts. Examples of the phosphonate group include a free phosphonate group (—P(=O)(OH)$_2$), phosphonate anions (—$PO_3H$—, and —$PO_3^{2-}$), and phosphonate salts. Examples of the carboxyl group include a free carboxyl group (—COOH), a carboxylate anion (—COO—), and carbonate salts.

The first anionic group is preferably, among the above-mentioned anionic groups, a sulfonate, phosphate or phosphonate group (in particular, a sulfonate group). However, among the anionic groups included in the intermediate layer, or the treating liquid for forming the intermediate layer, one or more anionic groups highest in electron-withdrawing property are defined as the first anionic group(s).

The second anionic group is preferably at least one selected from the group consisting of phosphate, phosphonate, carboxyl and hydroxyl groups. However, the second anionic group is lower in electron-withdrawing property than the first anionic group(s). The intermediate layer, or the treating liquid for forming the intermediate layer may contain one second anionic group species, or two or more second anionic group species. The hydroxyl group may be an alcoholic hydroxyl group, and is preferably a phenolic hydroxyl group since this group is higher in electron-withdrawing property. It is also preferred that the second anionic group(s) include(s) at least a carboxyl group. This case can further heighten the effect of restraining the corrosion of the anode body while ensuring the dissociatability and solubility of the cation agent. It is also preferred that the second anionic group(s) include(s) a phosphate group and/or a phosphonate group. This case can heighten the electrolytic capacitor in voltage resistant property.

(a1) Polymer (First Anion Agent)

The first anion agent that is a polymer (polymeric compound) is, for example, a copolymer (p1) made of monomer units each having the first anionic group(s) and monomer units each having the second anionic group(s), or a polymer (p2) including monomer units each having the first anionic group(s) and the second anionic group(s). The first anion agent may include one or more monomer unit species each having the first anionic group(s). The first anion agent may include one or more monomer unit species each having the second anionic group(s). The first anion agent may include one or more monomer unit species each having the first anionic group(s) and the second anionic group(s). In each of these monomer units, a number of the first anionic group(s) and a number of the second anionic group(s) may each be one or more. Such first anion agents may be used singly or in any combination of two or more thereof.

Examples of the monomer units, which each function as a skeleton of each of the monomer units each having the first anionic group(s) and/or the second anionic group(s), include aliphatic vinyl monomer units such as ethylene and propylene; aromatic vinyl monomers such as styrene; and diene monomers such as butadiene and isoprene.

The polymer (p2) may be a homopolymer or a copolymer. The copolymer of the polymer (p2) may contain not only the monomer units each having the first anionic group(s) and the second anionic group(s) but also monomer units each having the first anionic group(s), monomer units each having the second anionic group(s), and/or other copolymerizable monomer units. The copolymer (p1) may further contain different copolymerizable monomer units.

In these copolymers, examples of the other copolymerizable monomers include monomers each having the first anionic group(s), monomers each having the second anionic group(s), aliphatic vinyl monomers such as ethylene and propylene; aromatic vinyl monomers such as styrene; and diene monomers such as butadiene and isoprene. The other copolymerizable monomers may be used singly or in any combination of two or more thereof.

Examples of monomers each having one or more sulfonate groups as the first anionic group(s) include vinyl monomers each having one or more sulfonate groups; and diene monomers each having one or more sulfonate groups, such as isoprenesulfonic acid. Examples of the vinyl monomers each having the sulfonate group(s) include aliphatic vinyl monomers each having the sulfonate group(s), such as vinylsulfonic acid and allylsulfonic acid; and aromatic vinyl monomers each having the sulfonate group(s), such as styrenesulfonic acid. The monomers each having the sulfonate group(s) may be used singly or in any combination of two or more thereof.

Examples of monomers each having one or more phosphate groups as the first anionic group(s) or the second anionic group(s) include acid phosphoxy polyoxyalkylene glycol monoacrylates of any polymerizable unsaturated carboxylic acid (acid phosphoxy polyoxyethylene glycol mono (meth)acrylates (P(=O)(OH)$_2$—(O—$CH_2CH_2$)$_n$—O—C(=O)—CR=$CH_2$ wherein n is an integer from 2 to 10, and R is a hydrogen atom or a methyl group)), such as acid phosphoxy ethyl acrylate, and acid phosphoxy ethyl methacrylate. The acid phosphoxy ethyl or any other acid phosphoxy alkyl group is an alkyl group having a phosphate group. Acrylate and methacrylate are generically called (meth)acrylate. The monomers each having the phosphate group(s) may be used singly or in any combination of two or more thereof.

Examples of monomers each having phosphonic acid as the first anionic group(s) or the second anionic group(s) include aliphatic vinyl monomers each having the phosphonate group(s), such as vinylphosphonic acid, and allylphosphonic acid; and aromatic vinyl monomers each having the phosphonate group(s), such as styrenephosphonic acid. The monomers each having the phosphonate group(s) may be used singly or in any combination of two or more thereof.

Examples of monomers each having one or more carboxyl groups as the second anionic group(s) include acrylic acid, methacrylic acid, maleic acid, fumaric acid, and carboxystyrene. The monomers each having the carboxyl group(s) may be used singly or in any combination of two or more thereof.

Examples of monomers each having one or more hydroxyl groups as the second anionic group(s) include aromatic vinyl monomers each having the hydroxyl group(s), such as vinylphenol, and hydroxyvinyl toluene; and hydroxyalkyl esters of each of the above-mentioned monomers each having the carboxyl group(s) (for example, hydroxy $C_{1-4}$ alkyl esters thereof), such as hydroxyethyl acrylate, and hydroxyethyl methacrylate. The monomers each having the hydroxyl group(s) may be used singly or in any combination of two or more thereof.

Examples of monomers each having one or more sulfonate groups as the first anionic group(s) and one or more carboxyl groups as the second anionic group(s) include aromatic vinyl monomers each having one or more sulfonate groups and one or more carboxyl groups, such as vinylsulfobenzoic acid. These monomers may be used singly or in any combination of two or more thereof. Examples of monomers each having one or more phosphate groups as the first anionic group(s) and one or more carboxyl groups as the second anionic group(s) include 2-(dihydroxyphosphinyloxy)acrylic acid. Examples of monomers each having one or more phosphonate groups as the second anionic group(s) and one or more carboxyl groups as the second anionic group(s) include phosphonoacrylic acid, and 2-methyl-3-phosphonoacrylic acid.

Such first anion agents may be used singly or in any combination of two or more thereof.

In the first anion agent, the first anionic group is preferably a sulfonate group or a phosphate group. The second anionic group(s) may include a carboxyl group and/or a hydroxyl group. This case can further heighten the effect of restraining the corrosion of the anode body while ensuring the dissociatability and solubility of the cation agent. Thus, the leakage current can be more effectively restrained. For the same reason, it is also preferred that the second anionic group(s) include(s) at least a carboxyl group. It is also preferred that the first anionic group is a sulfonate group and the second anionic group(s) include(s) a phosphate group and/or a phosphonate group. This case can heighten the electrolytic capacitor in voltage resistant property.

The first anion agent is a polymer; thus, this case can further restrain an increase in the leakage current as compared with a case where the anion agent is a monomolecular material or a low molecular weight material. The case where the first anion agent is the copolymer (p1) makes it possible to add the first anionic group(s) and the second anionic group(s) evenly to the intermediate layer at a desired ratio between these anion group species. This addition can decrease the ESR and restrain an increase in the leakage current.

The weight-average molecular weight of the polymer is, for example, from 5,000 to 500,000, preferably from 10,000 to 200,000.

As required, the first anion agent may be used in a combination with the second anion agent that is a low molecular compound (monomer compound) having one or more anionic groups.

(a2) Second Anion Agent

The second anion agent may be any one of an aliphatic compound, an alicyclic compound and an aromatic compound. The aliphatic compound has one or more anionic groups and an aliphatic moiety (for example, methane, ethane or any other alkane moiety (such as a $C_{1-6}$ alkane moiety)) bonded to (each of) the anionic group(s). The alicyclic compound has one or more anionic groups, and an alicyclic moiety (for example, cyclopentane, cyclohexane, or any other cycloalkane moiety (such as a $C_{5-8}$ cycloalkane moiety)) bonded to (each of) the anionic group(s). The aromatic group has one or more anionic groups, and an aromatic moiety (for example, benzene, naphthalene, or any other arene moiety (such as a $C_{6-14}$ arene moiety) to (each of) the anionic group(s). The aliphatic moiety, the alicyclic moiety, and the aromatic moiety may each optionally have a substituent such as a halogen atom (such as a fluorine atom or a chlorine atom), an alkyl group (such as methyl, ethyl or any other $C_{1-4}$ alkyl group), or an alkenyl group (such as a vinyl group, or any other $C_{2-6}$ alkenyl group). The use of the second anion agent having an alicyclic moiety and an aromatic moiety (in particular, an aromatic moiety) heightens the affinity of the agent with the first conductive polymeric layer and/or the second conductive polymeric layer. Consequently, when the second conductive polymeric layer is formed, this layer can be made higher in formability and/or covering performance.

A number of the anionic group(s) of the second anion agent may be one or, two or more (such as two, three, or four). The anionic group(s) which the second anion agent has is appropriately selectable from the anionic groups given as the examples in the above description, and may be the above-mentioned first anionic group(s) and/or second anionic group(s). Specific examples of the second anion agent include anion agents each having the first anionic group(s), anion agents each having the second anionic group(s), and anion agents each having the first anionic group(s) and the second anionic group(s). These second anion agents may be used singly or in any combination of two or more thereof. For example, the first anion agent may be combined with any one of the anion agents each having the first anionic group(s), and/or any one of the anion agents each having the second anionic group(s). This combination may be further combined with any one of the anion agents each having the first anionic group(s) and the second anionic group(s). The second anion agent may contain one second anionic group species or may contain two or more second anionic group species.

Examples of the second anion agents each having one or more sulfonate groups as the anionic group(s) include aliphatic sulfonic acids (for example, $C_{1-6}$ alkanesulfonic acids, such as methanesulfonic acid), alicyclic sulfonic acids (for example, $C_{5-8}$ cycloalkanesulfonic acids, such as cyclohexanesulfonic acid), and aromatic sulfonic acids (for example, $C_{6-14}$ arenesulfonic acids, such as benzenesulfonic acid and styrenesulfonic acid).

Examples of the anion agent having one or more phosphate groups as the anionic group(s) include acid phosphoxy polyoxyalkylene glycol monoacrylates of any carboxylic acid (acid phosphoxy polyoxyethylene glycol mono(meth)acrylates ($P(=O)(OH)_2-(O-CH_2CH_2)_n-O-C(=O)-CR=CH_2$) wherein n is an integer from 2 to 10, and R is a hydrogen atom or a methyl group)), such as acid phosphoxy ethyl acrylate, and acid phosphoxy ethyl methacrylate.

Examples of the anion agents each having one or more phosphonate groups as the anionic group(s) include aliphatic phosphonic acids such as vinyl phosphonic acid; and aromatic phosphonic acids such as phenylphosphonic acid.

Examples of the second anion agents each having one or more carboxyl groups as the anionic group(s) include aliphatic carboxylic acids (for example, $C_{2-10}$ alkanecarboxylic acids, such as propionic acid, butanoic acid and hexanoic acid, and $C_{4-12}$ alkanedicarboxylic acids, such as hexanoic diacid); alicyclic carboxylic acids (for example, carboxy $C_{5-8}$ cycloalkanes, such as carboxycyclohexane, and dicarboxy $C_{5-8}$ cycloalkanes, such as cyclohexanedicarboxylic acid); aromatic carboxylic acids (for example, carboxy $C_{6-14}$ arenes, such as benzoic acid, carboxyhydroxy $C_{6-14}$ arenes such as salicylic acid, and dicarboxy $C_{6-14}$ arenes, such as phthalic acid, isophthalic acid, terephthalic acid, and naphthalene dicarboxylic acid).

Examples of the second anion agents each having one or more hydroxyl groups as the anionic group(s) include phenols such as phenol, hydroxytoluene, vinylphenol, and hydroxyvinyltoluene; and hydroxyalkyl esters of any one of the above-mentioned second anion agents each having one or more carboxyl groups, (for example, hydroxy $C_{1-4}$ alkyl esters), such as hydroxyethyl acrylate and hydroxyethyl methacrylate.

Examples of the second anion agents having one or more sulfonate groups as the first anionic group(s) and one or more carboxyl groups as the second anionic group(s) include aliphatic compounds such as sulfosuccinic acid; and aromatic compounds such as sulfobenzoic acid, sulfosalicylic acid, disulfosalicylic acid, sulfophthalic acid, sulfoisophthalic acid, sulfoterephthalic acid, and naphtholsulfonic acid. Examples of the second anion agents having one or more phosphate groups as the first anionic group(s) and one or more carboxyl groups as the second anionic group(s) include 2-(dihydroxyphosphinyloxy)acrylic acid. Examples of the second anion agents having one or more phosphonate groups as the first anionic group(s) and one or more carboxyl groups as the second anionic group(s) include phosphonoacrylic acid, and 2-methyl-3-phosphonoacrylic acid.

Out of these second anion agents, anion agents each having one or more sulfonate groups are preferred. In order for the electrolytic capacitor to be heightened in voltage resistance and/or be further restrained from undergoing a leakage current, the anionic group(s) in the second anion agent preferably include(s) a phosphate group and/or a phosphonate group.

The use of the first anion agent and the second anion agent makes it easy to adjust the ratio between the first anionic group(s) and the second anionic group(s) appropriately.

In the intermediate layer (or the treating liquid for forming the intermediate layer), a total of a number of the first anionic group(s) and a number of the second anionic group(s) is, for example, 0.8 times or more a number of the cationic group(s); preferably one or more time the number of the cationic group(s), or more than once the number; more preferably 1.1 times or more, or 1.2 times or more the number. When this total number of the first anionic group(s) and the second anionic group(s) is made larger than the number of the cationic group(s), the effect of restraining the volatilization of the cation agent can be enhanced. The total number of the first anionic group(s) and the second anionic group(s) may be, for example, 10 times or less; preferably 5 times or less; more preferably 3 times or less, or 2 times or less the number of the cationic group(s). Any one of these lower limit values may be combined with any one of these upper limit values. The total number of the first anionic group(s) and the second anionic group(s) may be, for example, from 0.8 to 10 times or 0.8 to 5 times the number of the cationic group(s); or more than once the number and less than 3 times the number, or more than once the number and less than 3 times the number. In order to heighten the formability and/or the covering performance of the second conductive polymeric layer, and further heighten the electrolytic capacitor in voltage resistant property, it is effective that a relationship between the total number of the first anionic group(s) and the second anionic group(s), and the number of the cationic group(s) is within such a scope.

The ratio of the number of the first anionic group(s) and/or the second anionic group(s) to the number of the cationic group(s) can be calculated out from the number of the first anionic group(s) and/or the second anionic group(s) per molecule of the used anion agent, the number of the cationic group(s) per molecule of the cation agent, the ratio by mole between the anion agent and the cation agent, and others. In the exemplary embodiments of the present invention, the ratio of the number of the first anionic group(s) and/or the second anionic group(s) to the number of the cationic group(s) in the intermediate layer may be substantially equal to the same ratio in the treating liquid for forming the intermediate layer since the volatilization of the cationic group(s) can be restrained.

In the intermediate layer (or the treating liquid for forming the intermediate layer), the ratio of the second anionic group(s) to that of the first anionic group(s) is, for example, 0.3 times or more, and may be 0.5 times or more, or once or more. In the intermediate layer (or the treating liquid for forming the intermediate layer), the number of the second anionic group(s) is preferably larger than that of the first anionic group(s). This case can further heighten the effect of restraining the corrosion of the anode body while ensuring the dissociatability and solubility of the cation agent. The ratio of the second anionic group(s) to that of the first anionic group(s) may be more than once, and may be preferably 2 times or more, or 3 times or more. The number of the second anionic group(s) is, for example, 6 times or less that of the first anionic group(s), and is preferably 5 times or less that of the first anionic group(s). Any one of these lower limit values may be combined with any one of these upper limit values. The number of the second anionic group(s) may be, for example, from 0.3 times to 6 times both inclusive, from 0.3 times to 5 times both inclusive, from 0.8 times to 6 times both inclusive, from once to 6 times both inclusive, from once to 5 times both inclusive, more than once and 5 times or less, from twice to 6 times both inclusive, or from twice to 5 times both inclusive the number of the first anionic group(s). When a relationship between the number of the second anionic group(s) and that of the first anionic group(s) is within such a scope, a balance is easily taken between the dissociatability and the solubility of the cation agent, and the effect of restraining the corrosion of the anode body.

The number of the cationic group(s) in the intermediate layer (or the treating liquid for forming the intermediate layer) means the number of the cationic group(s) contained in the intermediate layer (or the treating liquid for forming the intermediate layer) without being limited to the number of the cationic group(s) originating from the cation agent. In the intermediate layer (or the treating liquid for forming the intermediate layer), the number of the first anionic group(s) and that of the second anionic group(s) mean, respectively, the number of all the first anionic group(s) and that of all the second anionic group(s) contained in the intermediate layer (or the treating liquid for forming the intermediate layer) without being limited to the number of the first or second anionic group(s) originating from the first anion agent or the second anion agent.

The ratio of the number of the second anionic group(s) to that of the first anionic group(s) can be calculated out from the number of the first anionic group(s) and/or the second anionic group(s) per molecule of the used anion agent, and others. When a plurality of the anion agents are used, the ratio can be calculated from the ratio by mole between these agents, and others. In the intermediate layer, the ratio of the number of the second anionic group(s) to that of the first anionic group(s) is substantially equal to the same ratio in the treating liquid for forming the intermediate layer.

Second Conductive Polymeric Layer:

It is sufficient for the second conductive polymeric layer to be formed to cover at least one portion of the first conductive polymeric layer. This second conductive polymeric layer may be formed to cover the whole of one or more surfaces of the first conductive polymeric layer. In at least one region of the surface(s) of the first conductive polymeric layer, the second conductive polymeric layer is formed to cover the first conductive polymeric layer to interlay the intermediate layer between these layers. However, a region of the electrolytic capacitor may be present where the second conductive polymeric layer is formed directly on the surface(s) of the first conductive polymeric layer without interlaying the intermediate layer between these layers. Moreover, in a region of the electrolytic capacitor where the first conductive polymeric layer and the intermediate layer are not formed, the second conductive polymeric layer may contact the dielectric layer (in other words, the second conductive polymeric layer may be formed to cover the dielectric layer).

The second conductive polymeric layer includes a second conductive polymer. The second conductive polymeric layer may further include a dopant. The dopant may be included in the second conductive polymeric layer in a state that this layer is doped with the dopant. The dopant may also be included in a state that the dopant is bonded to the second conductive polymer.

Second Conductive Polymer:

The second conductive polymer may be a known conductive polymer usable for an electrolytic capacitor. Specifically, this polymer is appropriately selectable from the conductive polymers given as the examples about the first conductive polymeric layer. The weight-average molecular weight of the second conductive polymeric layer is also appropriately selectable from the ranges given as the examples about the first conductive polymeric layer. The first conductive polymeric layer may be the same as or different from the second conductive polymeric layer.

The second conductive polymeric layer further includes a dopant. The dopant may be a known dopant usable for an electrolytic capacitor. Specifically, the dopant is appropriately selectable from the dopants given as the examples about the first conductive polymeric layer. The dopant in the first conductive polymeric layer may be the same as or different from the dopant in the second conductive polymeric layer.

The amount of the dopant contained in the second conductive polymeric layer is preferably from 10 parts by mass to 1000 parts by mass both inclusive, more preferably from 50 parts by mass to 200 parts by mass both inclusive for 100 parts by mass of the second conductive polymer.

The average thickness of the second conductive polymeric layer is, for example, from 5 μm to 100 μm both inclusive, preferably from 10 μm to 50 μm both inclusive. When the average thickness is in such a range, the second conductive polymeric layer can be made higher in strength.

The ratio of the average thickness of the second conductive polymeric layer to that of the first conductive polymeric layer is, for example, 5 times or more, preferably 10 times or more. When the ratio between the average thicknesses is in such a range, the strength can be heightened.

In the exemplary embodiment described just above, the description has been made about the case in which a capacitor element has two conductive polymeric layers of a first conductive polymeric layer and a second conductive polymeric layer. However, the capacitor element may have three or more conductive polymeric layers. In this case, one or more conductive polymeric layers may be formed between the first conductive polymeric layer and the second conductive polymeric layer.

As required, the first and second conductive polymeric layers may each further include known additives, and/or one or more known conductive materials (for example, a conductive inorganic material such as manganese dioxide, and/or a TCNQ complex salt).

Between the dielectric layer and the first conductive polymeric layer, for example, a layer for heightening adhesiveness between these layers may be interlaid.

Method for Producing Electrolytic Capacitor:

A method according to an exemplary embodiment in the present disclosure, for producing an electrolytic capacitor, includes a first step of preparing an anode body; a second step of forming a dielectric layer over the anode body; a third step of treating the anode body, in which the dielectric layer is formed, with a first treating liquid including a first conductive polymer; a fourth step of treating the anode body treated with the first treating liquid with a second treating liquid including a cation agent containing at least one cationic group, and an anion agent containing at least one first anionic group and at least one second anionic group; and a fifth step of treating the anode body treated with the second treating liquid with a third treating liquid including a second conductive polymer. The anion agent includes a polymer (first anion agent) containing the first anionic group and the second anionic group, and the first anionic group is higher in electron-withdrawing property than the second anionic group.

Hereinafter, each of the steps will be described in more detail.

First Step

In the first step, an anode body is formed by a known method in accordance with the species of the anode body.

The anode body can be prepared, for example, by roughening one or more surfaces of a foil-piece or plate form substrate made of a conductive material. In the roughening of the surface(s), it is sufficient for irregularities to be made in the surface(s) of the substrate. The roughening may be attained, for example, by etching (for example, electroetching) the surface(s) of the substrate, or by depositing conductive material particles onto the substrate surface(s), using a gas phase method, such as vapor deposition.

Second Step:

In the second step, a dielectric layer is formed on the anode body. The dielectric layer is formed by anodizing one or more surfaces of the anode body. The anodization can be performed by a known treatment such as chemical conversion treatment. The chemical conversion treatment can be conducted, for example, by immersing the anode body into a chemical conversion liquid to impregnate the surface(s) (including inner wall surfaces of holes and pits made in the surface(s)) of the anode body with the chemical conversion liquid; and then applying a voltage to the anode body as an anode, and a cathode immersed in the chemical conversion liquid across these electrodes. The chemical conversion liquid is preferably, for example, an aqueous phosphoric acid solution, an aqueous ammonium phosphate solution, or an aqueous ammonium adipate solution.

Third Step:

In the third step, for example, the anode body, in which the dielectric layer is formed, is immersed into a first treating liquid, or a first treating liquid is poured into the anode body, in which the dielectric layer is formed. By the immersion or the pouring, the surface(s) (including dielectric-layer-formed inner wall surfaces of the holes and the pits made in the surface(s)) of the anode body is/are impregnated with the first treating liquid. After the impregnation with the first treating liquid, the anode body may be dried, as required. At the time of the drying, the anode body may be heated, as required. Through the third step, a first conductive polymer (and a dopant) can be caused to adhere onto the surface(s) of the dielectric-layer-formed anode body.

The first conductive polymer (and the dopant) may adhere in a coat form onto the surface(s) of the dielectric-layer-formed anode body to form a first conductive polymeric layer. The first conductive polymeric layer may be a coat (or coating film) formed by bringing the dielectric-layer-formed anode body into contact with the first treating liquid, and then drying. The first treating liquid is not particularly limited. The first treating liquid may be brought into contact with the surface(s) of the dielectric-layer-formed anode body, using a coating method that may be of various types (for example, a dip coating method or a spray coating method), or using, for example, a printing method or a combination of two or more of these methods.

The first treating liquid which contains the first conductive polymer is, for example, a solution containing a solvent and the first conductive polymer, or a liquid dispersion containing a dispersing medium and a dispersoid (or dispersion phase) of the first conductive polymer dispersed in this dispersing medium. When this solution or liquid dispersion is used as the first treating liquid, the first conductive polymeric layer can easily be formed. With a stable quality, this first conductive polymeric layer is easily obtained. It is particularly preferred to use the liquid dispersion. The form of the dispersoid in the liquid dispersion is not particularly limited. The form may be in a fibrous form, and is preferably in a particulate (or powdery) form. The average particle size of the dispersoid particles in the liquid dispersion is preferably from 5 nm to 100 nm. The average particle size can be gained from, e.g., a particle size distribution of the particles that is based on a dynamic light scattering method.

The solvent or dispersing medium contained in the first treating liquid may be, for example, water, an organic solvent, or a mixture of these liquids. Examples of the organic medium include aliphatic alcohols having 1 to 5 carbon atoms (for example, aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and sulfoxides such as dimethylsulfoxide.

As required, the first treating liquid may contain, out of the above-mentioned constituent components of the first conductive polymeric layer, components (for example, the above-mentioned dopant) other than the first conductive polymer.

In the third step, the anode body, in which the dielectric layer is formed, may be impregnated with the first treating liquid containing one or more raw materials for the first conductive polymer, and then the raw material(s) is/are polymerized (chemically polymerized or electrolytically polymerized) to form a polymerized film to cause the first conductive polymer to adhere to the anode body. The raw material(s) for the first conductive polymer is/are, for example, one or more precursors of the first conductive polymer, such as one or more monomers from which the first conductive polymeric is made, and/or one or more oligomers in which units of the monomer(s) are connected to each other.

For the formation of the polymerized film, an oxidizer is used to polymerize the raw material(s) for the first conductive polymer. The oxidizer may be added to the first treating liquid. The oxidizer may be applied onto the anode body before or after the dielectric-layer-formed anode body is immersed into the first treating liquid. This oxidizer is, for example, a metal sulfonate. The metal sulfonate has a function as a dopant as well as a function as the oxidizer. Examples of a sulfonic-acid-constituting moiety of the metal sulfonate include alkylsulfonic acids and aromatic sulfonic acids (such as benzenesulfonic acid, toluenesulfonic acid, and naphthalenesulfonic acid). Examples of a metal moiety constituting the metal salt include iron (III), copper (II), chromium (IV), and/or zinc (II).

The first treating liquid used to form the polymerized film may contain a solvent. The solvent is appropriately selectable from the solvents given as the examples about the first treating liquid used to form the above-mentioned coat (coating film).

As required, the first treating liquid used to form the polymerized film may contain, out of the above-mentioned constituent components of the first conductive polymeric layer, components (for example, the above-mentioned dopant) other than (the raw material(s) for) the first conductive polymer.

Fourth Step:

The fourth step can be performed, for example, by bringing a second treating liquid containing a cation agent and an anion agent into contact with the anode body treated with the first treating liquid. After the contact with the second treating liquid, the anode body may be dried as required. At the time of the drying, the anode body may be heated as required.

The second treating liquid may contain a solvent as well as the cation agent and the anion agent. The solvent may be, for example, water, an organic solvent, or a mixture of these liquids. Examples of the organic medium include aliphatic alcohols having 1 to 5 carbon atoms (for example, aliphatic monools such as methanol, ethanol, propanol, and 1-butanol; and aliphatic polyols such as ethylene glycol and glycerin); aliphatic ketones such as acetone; nitriles such as acetonitrile and benzonitrile; amides such as N,N-dimethylformamide; and/or sulfoxides such as dimethylsulfoxide.

The solvent preferably contains at least water. The proportion of the organic solvent in the whole of the solvent is preferably 15% or less by mass, more preferably 10% or less by mass, 5% or less by mass. It is preferred to set the concentration of the organic solvent contained in the second treating liquid into 5% or less by mass of the whole of the solvent. When the proportion of the organic solvent is in such a range, a change can be restrained in the organic solvent concentration with time by the volatilization of this solvent in a production process of the electrolytic capacitor. This matter makes it easy to restrain the volatilization of the cation agent, which follows the removal of the organic solvent, and an increase in the ESR, which follows the remaining of the organic solvent.

The ratio of the number of the first anionic group(s) to that of the second anionic group(s) is adjustable by adjusting the composition of the anion agent.

In the fourth step, it is preferred that the cation agent and the anion agent adhere to cover the first conductive polymer (and the dopant) adhering to the surface(s) of the dielectric layer. These agents may adhere in a coat form thereto to form an intermediate layer.

Fifth Step:

The fifth step can be performed in a manner identical with or similar to the manner used in the third step except that the anode body treated with the second treating liquid is used and further instead of the first treating liquid, a third treating liquid containing a second conductive polymer (and an optional dopant) is used. The third treating liquid may be a liquid identical with the first treating liquid except that instead of the first conductive polymer, the second conductive polymer is contained in this liquid.

Step of Forming Cathode Layer:

The method for producing the electrolytic capacitor may further include a (sixth) step of forming a cathode layer.

In the sixth step, a carbon layer and a silver paste layer are successively formed onto the surface(s) of (preferably the second conductive polymeric layer of) the anode body yielded through the fifth step.

The carbon layer can be formed by immersing the anode body having the second-conductive-polymeric-layer-formed dielectric layer into an aqueous liquid dispersion of carbon (for example, a conductive carbon material such as graphite), or by applying a carbon paste onto the surface(s) of the second conductive polymeric layer. The carbon paste is a composition including a conductive carbon material such as graphite. The thickness of the carbon layer is, for example, from 1 μm to 20 μm both inclusive.

The silver paste is a composition including silver particles and a resin (binder resin). The resin may be a thermoplastic resin, and is preferably a thermosetting resin. The thickness of the silver paste is, for example, from 50 μm to 100 μm both inclusive.

The structure of the cathode layer is not limited to this examples, and may be any structure having a current-collecting function.

EXAMPLES

Hereinafter, the present invention will be specifically made by way of examples and comparative examples. However, the technique according to the present invention is not limited to the examples.

Example 1

Electrolytic capacitor 1 illustrated in FIG. 1 was produced, and properties thereof were evaluated in the following manners:

(1) Step of Preparing Anode Body 2 (First Step)

Both surfaces of an aluminum foil piece (thickness: 100 μm) as a substrate were etched to be roughened. In this way, anode body 2 was produced.

(2) Step of Forming Dielectric Layer 3 (Second Step)

A one-end-portion-side region of anode body 2 (region from a separation portion of anode body 2 to the one end portion thereof) was immersed in a chemical conversion liquid, and a DC voltage of 70 V was applied thereto for 20 minutes to form dielectric layer 3 including aluminum oxide.

(3) Step of Forming First Conductive Polymeric Layer 4a (Third Step)

A 3,4-ethylenedioxythiophene monomer was added to an aqueous solution of polystyrenesulfonic acid (weight-average molecular weight: 75,000) while the solution was stirred. Next, oxidizers (iron (III) sulfate and sodium persulfate) were added thereto to conduct a chemical oxidization polymerization. The resultant polymer liquid was filtrated through an ion exchange device to remove impurities to yield a solution containing poly-3,4-ethylenedioxythiophene (PEDOT) as a first conductive polymer, and a polystyrenesulfonic acid (PSS) as a dopant.

Pure water was added to the resultant solution, and a high-pressure homogenizer was used to homogenize the solution. Furthermore, the solution was filtrated through a filter to prepare a first treating liquid in a liquid dispersion form.

Dielectric-layer-3-formed anode body 2 yielded in the item (2) was immersed into the first treating liquid, and then taken from the first treating liquid. Furthermore, the workpiece was dried at 120° C. for 10 to 30 minutes.

Each of the immersion into the first treating liquid and the drying was further repeated once to form first conductive polymeric layer 4a to cover surfaces of dielectric layer 3. The average thickness of first conductive polymeric layer 4a was measured through a scanning electron microscope (SEM). As a result, the thickness was about 1 μm.

(4) Step of Forming Intermediate Layer 4c (Fourth Step)

Into pure water was dissolved a copolymer (anion agent) made from N,N-dimethyloctylamine (cation agent), styrenesulfonic acid (monomer having one or more anionic groups), and acid phosphoxy ethyl acrylate (P(=O)(OH)$_2$—O—CH$_2$CH$_2$—O—C(=O)—CH=CH$_2$) (monomer having one or more second anionic groups) to prepare a second treating liquid. The respective concentrations of the cation agent and the anion agent in the second treating liquid were 0.05 mol/L and 0.03 mol/L. The ratio of the number of the sulfonate groups, which are the first anionic groups, to that of the phosphate groups, which are the second anionic groups, was 3 times.

Anode body 2 treated in the item (3) was immersed into the second treating liquid, and then taken out. Furthermore, this workpiece was dried at 100° C. for 3 minutes to form intermediate layer 4c to cover surfaces of first conductive polymeric layer 4a. In the intermediate layer, the ratio of the total number of the first anionic groups and the second anionic groups to the number of the cationic groups, and the ratio between the number of the first anionic groups and that of the second anionic groups were substantially equal to the respective ratios in the second treating liquid.

The anion agent used in the second treating liquid was produced as follows:

To a predetermined amount of pure water were added sodium styrenesulfonate and acid phosphoxy ethyl acrylate. These components were mixed with each other to prepare a monomer solution. At this time, sodium styrenesulfonate and acid phosphoxy ethyl acrylate were used to set the copolymerization ratio (ratio by mole) of styrenesulfonic acid to acid phosphoxy ethyl acrylate to 75/25 in a copolymer to be yielded. A predetermined amount of ammonium persulfate (oxidizer) was added to the monomer solution while the solution was stirred, so as to conduct a polymerization reaction over 8 hours. To the resultant polymer liquid were then added pure water and ion exchange resin. The liquid was stirred and filtrated to be subjected to a purifying treatment. This purifying treatment was repeated plural times to yield the copolymer referred to above finally. A molecular weight of the copolymer was measured by gel permeation chromatography (GPC) was measured. As a result, the weight-average molecular weight was 83,000.

(5) Step of Forming Second Conductive Polymeric Layer 4b (Fifth Step)

A third treating liquid was used which had the same composition as the first treating liquid used in the item (3). Anode body 2 treated in the item (4) was immersed into the third treating liquid, taken out, and then further dried at 120° C. for 10 to 30 minutes. The immersion into the third treating liquid and the drying were further alternately repeated two times to form second conductive polymeric layer 4b to cover surfaces of the intermediate layer 4c. In the same way as used in the case of first conductive polymeric layer 4a, the average thickness of second conductive polymeric layer 4b was measured. As a result, the thickness was about 30 μm.

In this way, first conductive polymeric layer 4a, intermediate layer 4c and second conductive polymeric layer 4b were formed to cover the surfaces of dielectric layer 3.

(6) Step of Forming Cathode Layer 5 (Sixth Step)

Anode body 2 yielded in the item (5) was immersed in a liquid dispersion in which graphite particles were dispersed in water, taken out from the liquid dispersion, and then dried to form carbon layer 5a on surfaces of at least second conductive polymeric layer 4b. The drying was performed at a temperature from 130° C. to 180° C. both inclusive for a period from 10 minutes to 30 minutes both inclusive.

Next, a silver paste containing silver particles and a binder resin (epoxy resin) was applied onto surfaces of carbon layer 5a, and then the workpiece was heated at a temperature from 150° C. to 200° C. both inclusive for a period from 10 minutes to 60 minutes both inclusive to cure the binder resin to form silver paste layer 5b. In this way, cathode layer 5 was formed, which was composed of carbon layer 5a and silver paste layer 5b.

As described above, capacitor element 11 was produced.

(7) Fabrication of Electrolytic Capacitor

Cathode layer 5 of capacitor element 11 yielded in the item (6) was joined with one end portion 14a (first end portion) of cathode terminal 14 through conductive adhesive 17. A different end portion of anode body 2 that is projected from capacitor element 11 was joined with one end portion 13a (first end portion) of anode terminal 13 by laser welding.

Next, a transfer molding method was used to form resin external package 12 made of a conductive resin around capacitor element 11. At this time, the other end portion 13b (second end portion) of anode terminal 13 and the other end portion 14b (second end portion) of cathode terminal 14 were made into a state of being pulled out from resin external package 12.

In this way, electrolytic capacitor 1 (A1) was finished. In the same way as described above, electrolytic capacitors 1 were produced in a total number of 250.

(8) Evaluation

The electrolytic capacitors were used to make the following evaluations:

(a) ESR

From the electrolytic capacitors, 120 were selected at random, and then a four-terminal-measuring LCR meter was used to the ESR value (mΩ) of each of the electrolytic capacitors at a frequency of 100 kHz. The average value of the measured values was calculated out.

(b) Leakage Current

A resistor having a resistance of 1 kΩ was connected in series to each of the electrolytic capacitors, and a DC power source was used to apply a constant voltage of 25 V to the electrolytic capacitor for 1 minute. Thereafter, a leakage current (μA) from the capacitor was measured. The average value of the measured values of the 250 electrolytic capacitors was calculated out.

(c) Voltage Resistance

A voltage was applied to each of the electrolytic capacitors while the voltage was raised at a rate of 1.0 V/second. The breakdown dielectric voltage (BVD) of the electrolytic capacitor was measured at the time of a dielectric breakdown in which an overcurrent of 1 A flowed. The average value of the measured values of the 250 electrolytic capacitors was gained.

Comparative Example 1

Electrolytic capacitors (B1) were produced in the same way as in Example 1 except that in the fourth step, as the anion agent, polystyrenesulfonic acid (weight-average molecular weight: 75,000) was used, and the concentration of the anion agent in the second treating liquid was changed to 0.075 mol/L. The electrolytic capacitors were evaluated in the same way as in Example 1.

Comparative Examples 2 and 3

Electrolytic capacitors (B2 and B3) were produced in the same way as in Comparative Example 1 except that in the fourth step, the concentration of the anion agent in the second treating liquid was changed to 0.05 mol/L (in Comparative Example 2) and 0.03 mol/L (in Comparative Example 3). The electrolytic capacitors (B2 and B3) were evaluated in the same way as in Example 1.

Comparative Example 4

Electrolytic capacitors (B4) were produced in the same way as in Example 1 except that in the fourth step, p-toluenesulfonic acid was used as the anion agent, and the concentration of the anion agent in the second treating liquid was changed to 0.075 mol/L. The electrolytic capacitors were evaluated in the same way as in Example 1.

Examples 2 to 5

Electrolytic capacitors (A2 to A5) were produced in the same way as in Example 1 except that in the fourth step in each of these examples, the following was/were changed to set, in the second treating liquid (or the intermediate layer), the ratio of the number of the second anionic group(s) to that of the first anionic group(s) to a value shown in Table 1: the copolymerization ratio (ratio by mole) between the monomer having the first anionic group(s) and the monomer having the second anionic group(s); and/or the concentration of the anion agent in the second treating liquid. The electrolytic capacitors were evaluated in the same way as in Example 1.

Examples 6 to 8

Electrolytic capacitors (A6 to A8) were produced in the same way as in Example 1 except that in the fourth step in each of these examples, a second treating liquid was used which contained, as its anion agent, a copolymer made from acid phosphoxy ethyl acrylate (monomer having one or more first anionic groups) and acrylic acid (monomer having a second anionic group) in a concentration shown in Table 1, and that the copolymerization ratio (ratio by mole) between the monomer having the first anionic group(s) and the monomer having the second anionic group was changed as shown in Table 1. The electrolytic capacitors were evaluated in the same way as in Example 1.

Examples 9 and 10

Electrolytic capacitors (A9 and A10) were produced in the same way as in Example 1 except that in the fourth step in each of these examples, a second treating liquid was used which contained, as its anion agent, a copolymer made from styrenesulfonic acid (monomer having one or more first anionic groups) and acrylic acid (monomer having a second anionic group) in a concentration shown in Table 1, and that the copolymerization ratio (ratio by mole) between the monomer having the first anionic group(s) and the monomer having the second anionic group was changed as shown in Table 1. The electrolytic capacitors were evaluated in the same way as in Example 1.

Examples 11 to 13

Electrolytic capacitors (A11 to A13) were produced in the same way as in Example 1 except that in the fourth step in each of the examples, as the anion agent, a copolymer was used which was made from styrenesulfonic acid (monomer having one or more first anionic groups), and a monomer shown in Table 1 and having one or more second anionic groups. The electrolytic capacitors were evaluated in the same way as in Example 1.

Example 14

Electrolytic capacitors (A14) were produced in the same way as in Example 1 except that in the fourth step, as the anion agent, a copolymer was used which was made from vinylphosphonic acid (monomer having one or more first anionic groups), and acrylic acid (monomer having a second anionic group), and that the copolymerization ratio (ratio by mole) between the monomer having the first anionic group(s) and the monomer having the second anionic group was changed to 50/50. The electrolytic capacitors were evaluated in the same way as in Example 1.

In Table 1 are shown the evaluation results of the working examples and the comparative examples. In Table 1 are also shown the respective molecular weights of the used anion agents. The molecular weight of the anion agent used in each of the working examples and Comparative Examples 1 to 3 is the weight-average molecular weight of the anion agent.

TABLE 1

| | Cation | | Anions | | | | | "Number of anionic groups"/"number of cationic group(s)" | Evaluation results | | |
|---|---|---|---|---|---|---|---|---|---|---|---|
| | Cation agent | Concentration [mol/L] | Monomer $M_1$ having one or more first anionic groups | Monomer $M_2$ having one or more second anionic groups | Copolymerization ratio by mole ($M_1/M_2$) | Concentration [mol/L] | "Second anionic group(s)"/"first anionic group(s)" | Anion agent molecular weight | | ESR [mΩ] | Leakage current [μA] | Voltage resistance [V] |
| A1 | N,N-dimethyl-octylamine | 0.05 | Styrenesulfonic acid | Acid phosphoxy ethyl acrylate | 75/25 | 0.030 | 3.00 | 83000 | 1.2 | 27 | 0.1 | 63 |
| A2 | N,N-dimethyl-octylamine | 0.05 | Styrenesulfonic acid | Acid phosphoxy ethyl acrylate | 75/25 | 0.250 | 3.00 | 83000 | 1.0 | 39 | 1.6 | 55 |
| A3 | N,N-dimethyl-octylamine | 0.05 | Styrenesulfonic acid | Acid phosphoxy ethyl acrylate | 75/25 | 0.020 | 3.00 | 83000 | 0.8 | 40 | 0.7 | 56 |
| A4 | N,N-dimethyl-octylamine | 0.05 | Styrenesulfonic acid | Acid phosphoxy ethyl acrylate | 83.3/16.7 | 0.030 | 4.99 | 83000 | 1.2 | 29 | 0.1 | 64 |
| A5 | N,N-dimethyl-octylamine | 0.05 | Styrenesulfonic acid | Acid phosphoxy ethyl acrylate | 75/25 | 0.050 | 3.00 | 83000 | 2.0 | 30 | 0.2 | 69 |
| A6 | N,N-dimethyl-octylamine | 0.05 | Acid phosphoxy ethyl acrylate | Acrylic acid | 50/50 | 0.030 | 1.00 | 65000 | 1.2 | 26 | 0.1 | 71 |
| A7 | N,N-dimethyl-octylamine | 0.05 | Acid phosphoxy ethyl acrylate | Acrylic acid | 25/75 | 0.030 | 0.33 | 65000 | 1.2 | 24 | 0.1 | 70 |
| A8 | N,N-dimethyl-octylamine | 0.05 | Acid phosphoxy ethyl acrylate | Acrylic acid | 25/75 | 0.050 | 0.33 | 65000 | 2.0 | 29 | 0.1 | 68 |
| A9 | N,N-dimethyl-octylamine | 0.05 | Styrenesulfonic acid | Acrylic acid | 75/25 | 0.030 | 3.00 | 77000 | 1.2 | 25 | 0.3 | 64 |
| A10 | N,N-dimethyl-octylamine | 0.05 | Styrenesulfonic acid | Acrylic acid | 33.3/66.7 | 0.038 | 0.50 | 77000 | 1.5 | 27 | 0.5 | 62 |
| A11 | N,N-dimethyl-octylamine | 0.05 | Styrenesulfonic acid | Vinylphosphonic acid | 75/25 | 0.030 | 3.00 | 51000 | 1.2 | 27 | 0.1 | 68 |
| A12 | N,N-dimethyl-octylamine | 0.05 | Styrenesulfonic acid | Hydroxyethyl methacrylate | 75/25 | 0.030 | 3.00 | 110000 | 1.2 | 24 | 0.4 | 60 |
| A13 | N,N-dimethyl-octylamine | 0.05 | Styrenesulfonic acid | Acid phosphoxy ethyl methacrylate | 75/25 | 0.030 | 3.00 | 108000 | 1.2 | 27 | 0.1 | 68 |
| A14 | N,N-dimethyl-octylamine | 0.05 | Vinylphosphonic acid | Acrylic acid | 50/50 | 0.030 | 1.00 | 58000 | 1.2 | 28 | 0.1 | 67 |
| B1 | N,N-dimethyl-octylamine | 0.05 | Polystyrenesulfonic acid | | — | 0.075 | — | 75000 | 1.5 | 79 | 125.0 | 27 |
| B2 | N,N-dimethyl-octylamine | 0.05 | Polystyrenesulfonic acid | | — | 0.050 | — | 75000 | 1.0 | 83 | 79.0 | 29 |
| B3 | N,N-dimethyl-octylamine | 0.05 | Polystyrenesulfonic acid | | — | 0.030 | — | 75000 | 0.6 | 91 | 210.0 | 26 |
| B4 | N,N-dimethyl-octylamine | 0.05 | p-Toluenesulfonic acid | | — | 0.075 | — | 172 | 1.5 | 75 | 110.0 | 26 |

As shown in Table 1, the working examples, which each made use of the polymer containing the first anionic group and the second anionic group lower in electron-withdrawing property than the first anionic group(s), were particularly smaller in ESR value and leakage current than Comparative Examples 1 to 3, which each made use of polystyrenesulfonic acid as the anion agent, and Comparative Example 4, which made use of p-toluenesulfonic acid. Moreover, the working examples were remarkably higher in voltage resistance than the comparative examples.

INDUSTRIAL APPLICABILITY

The electrolytic capacitor according to the exemplary embodiment of the present invention is usable for various articles required to be decreased in ESR and be restrained from undergoing a leakage current.

REFERENCE MARKS IN THE DRAWINGS 1 electrolytic capacitor
2 anode body
3 dielectric layer
4 conductive polymeric layer
4a first conductive polymeric layer
4b second conductive polymeric layer
4c intermediate layer
5 cathode layer
5a carbon layer
5b silver paste layer
11 capacitor element
12 resin external package
13 anode terminal
13a first end portion of anode terminal
13b second end portion of anode terminal
14 cathode terminal
14a first end portion of cathode terminal
14b second end portion of cathode terminal
15 cathode portion
16 separation portion
17 conductive adhesive

The invention claimed is:

1. An electrolytic capacitor, comprising:
an anode body;
a dielectric layer formed over the anode body;
a first conductive polymeric layer covering at least one portion of the dielectric layer;
a second conductive polymeric layer covering at least one portion of the first conductive polymeric layer; and
an intermediate layer formed between the first conductive polymeric layer and the second conductive polymeric layer, wherein:
the intermediate layer comprises a cation agent containing at least one cationic group, and an anion agent containing at least one first anionic group and at least one second anionic group,
the anion agent comprises a polymer containing the first anionic group and the second anionic group, and
the first anionic group is higher in electron-withdrawing property than the second anionic group.

2. The electrolytic capacitor according to claim 1, wherein the first anionic group is a sulfonate group, a phosphate group, or a phosphonate group.

3. The electrolytic capacitor according to claim 1, wherein the first anionic group is a sulfonate group.

4. The electrolytic capacitor according to claim 1, wherein the second anionic group is of at least one species selected from the group consisting of phosphate group, phosphonate group, carboxyl group, and hydroxyl group species.

5. The electrolytic capacitor according to claim 1, wherein the second anionic group contains at least a carboxyl group.

6. The electrolytic capacitor according to claim 1, wherein in the intermediate layer, a number of the second anionic group is larger than a number of the first anionic group.

7. The electrolytic capacitor according to claim 6, wherein the number of the second anionic group is from 0.3 times to 6 times both inclusive the number of the first anionic group.

8. The electrolytic capacitor according to claim 1, wherein a weight-average molecular weight of the polymer is from 5,000 to 500,000.

9. The electrolytic capacitor according to claim 1, wherein the cationic group is an amino group.

10. An electrolytic capacitor, comprising:
an anode body;
a dielectric layer formed over the anode body; and
a conductive polymeric layer covering at least one portion of the dielectric layer, wherein:
a cation agent containing at least one cationic group, and an anion agent containing at least one first anionic group and at least one second anionic group adhere to the conductive polymeric layer,
the anion agent comprises a polymer containing the first anionic group and the second anionic group, and
the first anionic group is higher in electron-withdrawing property than the second anionic group.

11. The electrolytic capacitor according to claim 10, wherein the first anionic group is a sulfonate group, a phosphate group, or a phosphonate group.

12. The electrolytic capacitor according to claim 10, wherein the first anionic group is a sulfonate group.

13. The electrolytic capacitor according to claim 10, wherein the second anionic group is of at least one species selected from the group consisting of phosphate group, phosphonate group, carboxyl group, and hydroxyl group species.

14. The electrolytic capacitor according to claim 10, wherein the second anionic group contains at least a carboxyl group.

15. The electrolytic capacitor according to claim 10, wherein in the anion agent, a number of the second anionic group is larger than a number of the first anionic group.

16. The electrolytic capacitor according to claim 15, wherein the number of the second anionic group is from 0.3 times to 6 times both inclusive the number of the first anionic group.

17. The electrolytic capacitor according to claim 10, wherein a weight-average molecular weight of the polymer is from 5,000 to 500,000.

18. The electrolytic capacitor according to claim 11, wherein the cationic group is an amino group.

19. An electrolytic capacitor, comprising:
an anode body;
a dielectric layer formed over the anode body; and
a conductive polymeric layer covering at least one portion of the dielectric layer, wherein:
the conductive polymeric layer comprises a cation agent containing at least one cationic group, and an anion agent containing at least one first anionic group and at least one second anionic group,
the anion agent comprises a polymer containing the first anionic group and the second anionic group, and
the first anionic group is higher in electron-withdrawing property than the second anionic group.

20. The electrolytic capacitor according to claim 19, wherein the first anionic group is a sulfonate group, a phosphate group, or a phosphonate group.

21. The electrolytic capacitor according to claim 19, wherein the first anionic group is a sulfonate group.

22. The electrolytic capacitor according to claim 19, wherein the second anionic group is of at least one species selected from the group consisting of phosphate group, phosphonate group, carboxyl group, and hydroxyl group species.

23. The electrolytic capacitor according to claim 19, wherein the second anionic group contains at least a carboxyl group.

24. The electrolytic capacitor according to claim 19, wherein in the anion agent, a number of the second anionic group is larger than a number of the first anionic group.

25. The electrolytic capacitor according to claim 24, wherein the number of the second anionic group is from 0.3 times to 6 times both inclusive the number of the first anionic group.

26. The electrolytic capacitor according to claim 19, wherein a weight-average molecular weight of the polymer is from 5,000 to 500,000.

27. The electrolytic capacitor according to claim 19, wherein the cationic group is an amino group.

* * * * *